US009733807B2

(12) United States Patent
Wu et al.

(10) Patent No.: US 9,733,807 B2
(45) Date of Patent: Aug. 15, 2017

(54) TECHNIQUES TO HANDLE MULTIMEDIA QUESTIONS FROM ATTENDEES IN AN ONLINE MEETING

(71) Applicant: Cisco Technology, Inc., San Jose, CA (US)

(72) Inventors: Yuan Wu, Jiangsu (CN); Haihua Huang, Jiangsu (CN); Qian Wang, Jiangsu (CN)

(73) Assignee: Cisco Technology, Inc., San Jose, CA (US)

( * ) Notice: Subject to any disclaimer, the term of this patent is extended or adjusted under 35 U.S.C. 154(b) by 431 days.

(21) Appl. No.: 14/265,477

(22) Filed: Apr. 30, 2014

(65) Prior Publication Data

US 2015/0317123 A1 Nov. 5, 2015

(51) Int. Cl.
*G06F 3/16* (2006.01)
*G06F 3/0481* (2013.01)
*G06F 3/0484* (2013.01)
*H04L 29/06* (2006.01)
*G11B 20/10* (2006.01)
*H04M 3/56* (2006.01)
*G06F 3/0488* (2013.01)

(52) U.S. Cl.
CPC ........ *G06F 3/0484* (2013.01); *G06F 3/04847* (2013.01); *G06F 3/165* (2013.01); *G06F 3/167* (2013.01); *G11B 20/10527* (2013.01); *H04L 29/06* (2013.01); *H04L 65/1089* (2013.01); *H04L 65/403* (2013.01); *H04M 3/568* (2013.01); *G06F 3/0488* (2013.01)

(58) Field of Classification Search
None
See application file for complete search history.

(56) References Cited

U.S. PATENT DOCUMENTS

| 7,373,608 | B2 | 5/2008 | Lentz | |
|---|---|---|---|---|
| 7,870,494 | B2 | 1/2011 | Lentz | |
| 8,745,519 | B2* | 6/2014 | Grotjohn | G06F 9/4443 715/777 |
| 2006/0010392 | A1* | 1/2006 | Noel | G06F 3/0481 715/759 |
| 2008/0133664 | A1 | 6/2008 | Lentz | |
| 2011/0047514 | A1* | 2/2011 | Butin | G06F 9/4446 715/841 |
| 2012/0226984 | A1* | 9/2012 | Bastide | G06Q 10/107 715/730 |
| 2013/0332856 | A1* | 12/2013 | Sanders | G06F 3/0481 715/753 |

(Continued)

*Primary Examiner* — Mahelet Shiberou
(74) *Attorney, Agent, or Firm* — Edell, Shapiro & Finnan, LLC

(57) ABSTRACT

An attendee device in an online meeting displays content from a presenter device in a shared area of an attendee device display. The attendee device detects that the shared area is pressed continuously at a press point therein for a predetermined time and, in response, records a location of the press point in the shared area, records an image snapshot of the shared area, and records audio sensed by a local microphone. The attendee device also detects when the press point is released and, in response, ends the audio recording. The attendee device displays a dialog box that presents user selectable options to store locally, upload to the meeting server, and not retain any of the recorded snapshot and the recorded audio.

23 Claims, 14 Drawing Sheets

(56) References Cited

U.S. PATENT DOCUMENTS

| | | | |
|---|---|---|---|
| 2014/0101579 A1* | 4/2014 | Kim | G06F 3/0486 |
| | | | 715/761 |
| 2015/0040029 A1* | 2/2015 | Koum | H04L 51/10 |
| | | | 715/748 |
| 2015/0085064 A1* | 3/2015 | Sanaullah | H04M 3/568 |
| | | | 348/14.08 |

* cited by examiner

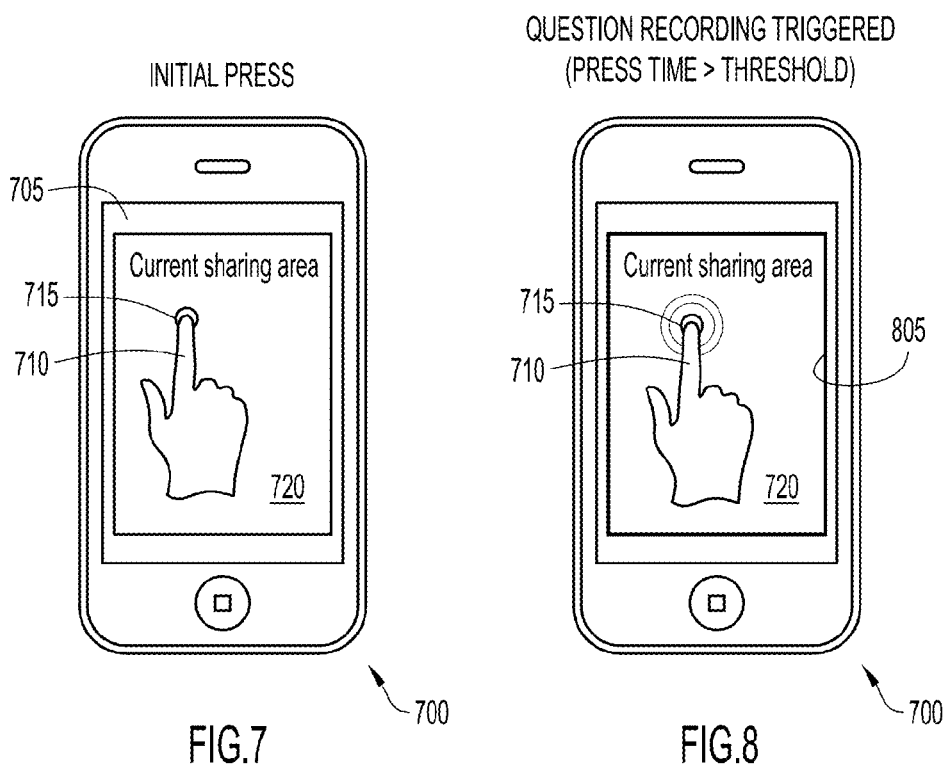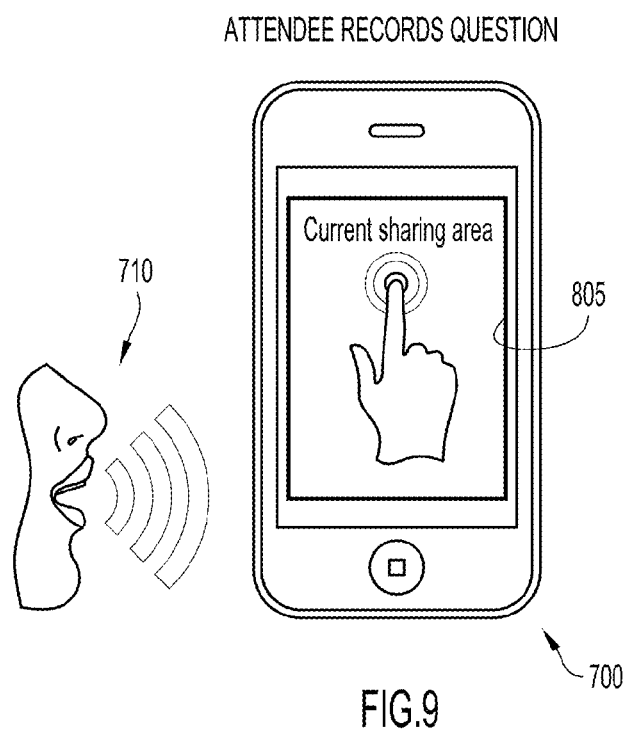

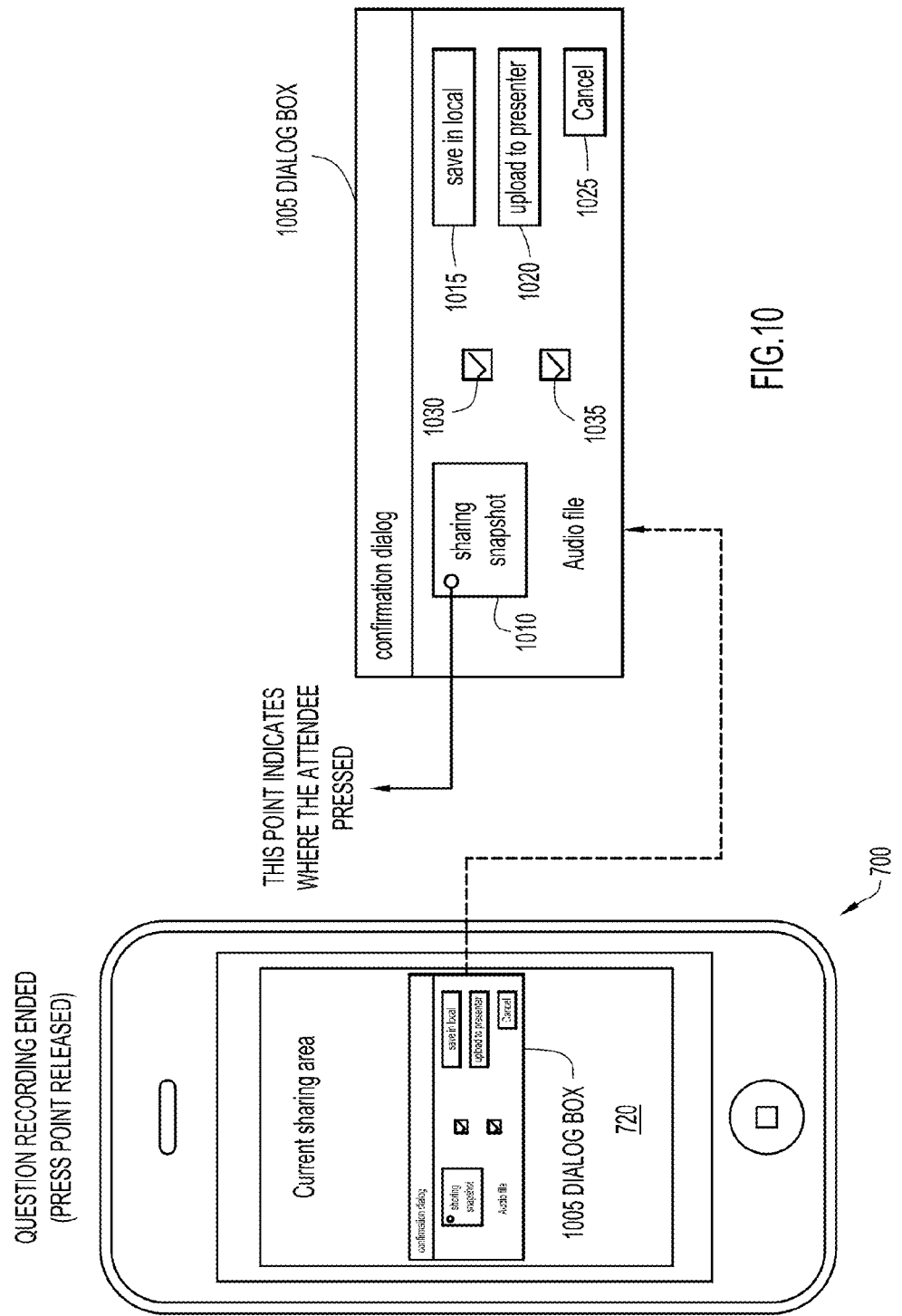

TECHNIQUES TO HANDLE MULTIMEDIA QUESTIONS FROM ATTENDEES IN AN ONLINE MEETING

TECHNICAL FIELD

The present disclosure relates to handling attendee questions in online meetings.

BACKGROUND

Online meetings allow attendees from around the world to communicate and share ideas. An attendee to an online meeting may wish to ask a question intended for other participants, including other attendees and a meeting presenter. The attendee may input the question at a local attendee device in the form of text, e.g., the question may be typed manually; however, a typed question may not be noticed by the presenter. Moreover, an attendee connected to the online meeting through a mobile device may find it inconvenient to type the question on the mobile device. As an alternative, the attendee may ask the question by speaking into a microphone of the attendee device; however a complication arises when the attendee device is muted to reduce background noise. As a result, the attendee must first unmute the attendee device, speak into the microphone, and then mute the attendee device again to reduce noise. Frequent toggling between mute and unmute is bothersome, may be inconvenient for a mobile attendee, and interrupts a natural flow of the presenter in the online meeting.

BRIEF DESCRIPTION OF THE DRAWINGS

FIGS. 7-10 are illustrations of interactions between an attendee and attendee device associated with a question recording session, according to an example embodiment.

DESCRIPTION OF EXAMPLE EMBODIMENTS

Overview

Techniques presented herein relate to handing questions from attendees in an online meeting. In a first embodiment, an attendee device is configured to communicate with a presenter device in an online meeting in which the attendee device is configured to share content with the attendee device. The attendee device displays the content in a shared area. The attendee device detects that the shared area is pressed continuously at a press point therein for a predetermined time. In response, the attendee device records a location of the press point in the shared area, records an image snapshot of the shared area, and records audio sensed by a local microphone while the press point continues to be pressed after the predetermined time. The attendee device also detects when the press point is released and, in response, ends the audio recording. The attendee device selectively uploads to the presenter device at least one of (i) the recorded audio, and (ii) the recorded snapshot and the recorded press point location.

In a second embodiment, a presenter device is configured to communicate with attendee devices in an online meeting in which the presenter device is configured to share content with the attendee devices corresponding to attendees and the attendee devices are configured to send questions as replay packets to the presenter device. The presenter device receives messages that identify each question sent by each attendee device and the corresponding attendee. The presenter device displays a list of attendees to the online meeting each annotated with user selectable question identifiers for all questions identified in the messages received and the corresponding attendee. The presenter device receives a selection of a question identifier for a listed attendee from a presenter/user and, in response, retrieves the multimedia replay packet for the question corresponding to the selected question identifier. The presenter device plays while sharing with the attendee devices in the online meeting the retrieved replay packet.

Example Embodiments

Figure 1:
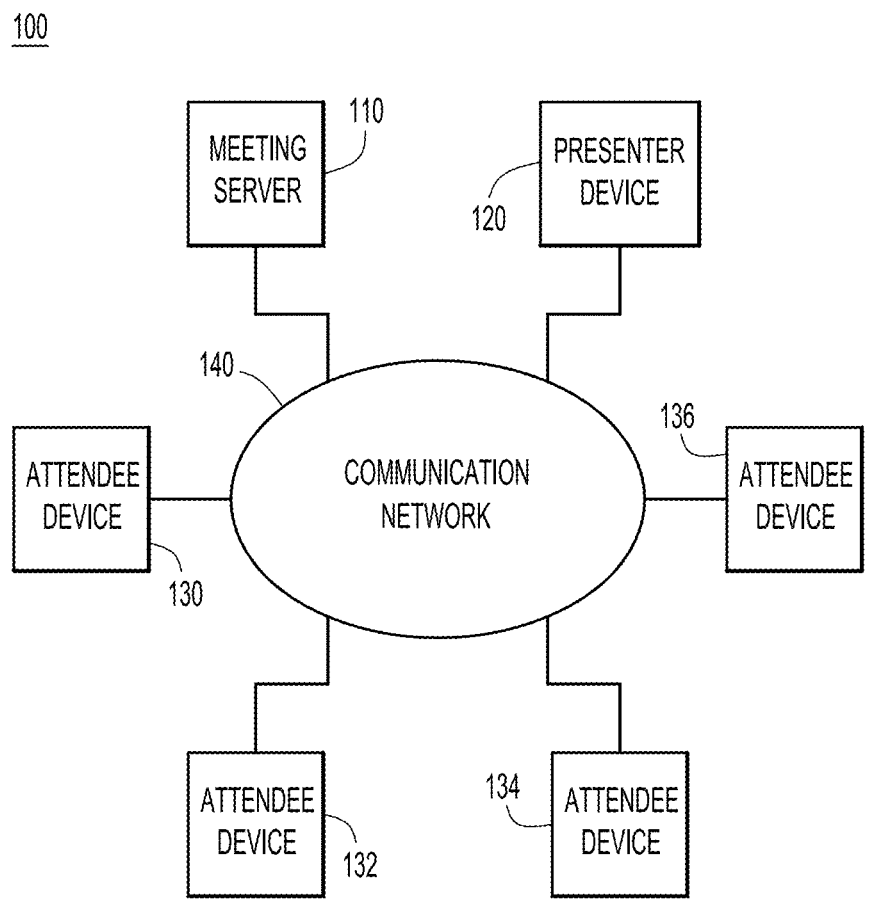
FIG. 1 is a block diagram of an example system of devices configured to participate in an online meeting, according to an example embodiment.

Referring to FIG. 1, a conference system 100 is shown that enables a meeting server 110 to facilitate an online meeting (also referred to as a web meeting or web-based conference session) in which participants/users can share voice, video, chat, and/or other types of data communication through presenter device 120 and attendee devices 130, 132, 134, and 136 over network 140. The online meeting may further comprise desktop sharing and/or application sharing. Only four attendee devices are shown in FIG. 1, but any number of attendee devices may be included in system 100. Additionally, the presenter device 120 and attendee devices 130, 132, 134, and 136 may have the same capabilities in the online meeting, with the exception that the presenter device 120 is designated, during some period of time, to share content with the attendee devices in the online meeting. The designation of "presenter device" may change throughout the online meeting, and is used herein merely to specify which of the participant devices is currently sharing content. In general, presenter device 120 and attendee devices 130, 132, 134, and 136 may take a variety of forms, including a desktop computer, laptop computer, mobile/cellular phone (e.g., Smartphone), tablet computer, Internet telephone, etc. Network 140 may be any type of network (e.g., any combination of Internet, intranet, local area network (LAN), wide area network (WAN), wired network, wireless network, etc.) that connects computing devices, e.g., presenter device 120 and attendee devices 130, 132, 134, and 136. Meeting server 110 may be used, for example, to mediate transactions between presenter device 120 and attendee devices 130, 132, 134, and 136. Server 110 may also perform caching or other time/bandwidth saving techniques. It should be understood that in a web-based conference system, each device may communicate with the server 110 through a browser application having one or more plug-ins that enable the web-based meeting experience, and allow for the transmission of data to the meeting server 110, and the reception of data from the meeting server during a conference/meeting session.

Techniques presented herein provide convenient ways to handle attendee questions in an online meeting in system 100. For example, the techniques provide convenient ways for an attendee to trigger a multimedia question recording session using an associated attendee device (e.g., device 130) and then submit the recorded multimedia question to a presenter. The techniques also provide convenient ways for the presenter to view, retrieve, and share multimedia questions submitted by the attendees using a presenter device (e.g., presenter device 120) associated with the presenter. The techniques are described below in detail beginning with FIG. 4.

Figure 2:
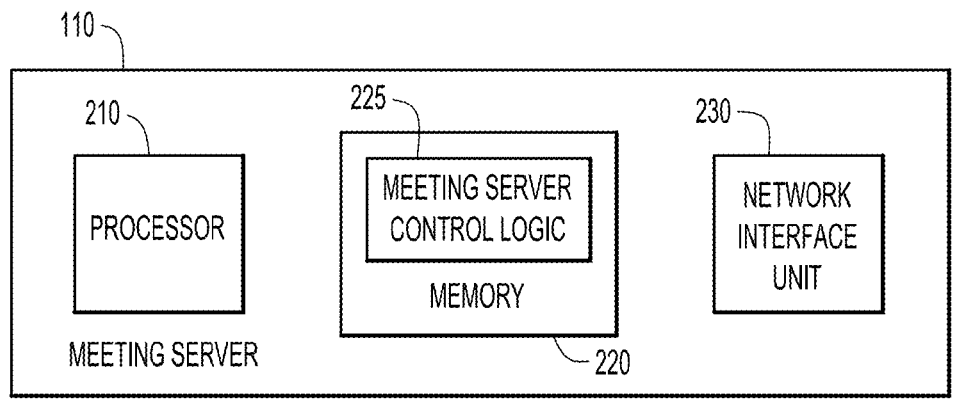
FIG. 2 is a block diagram of an example meeting server configured to facilitate the online meeting, according to an example embodiment.

Referring now to FIG. 2, a simplified block diagram of meeting server 110 is shown. Server 110 includes a processor 210 to process instructions relevant to an online meeting supported by the system 100, memory 220 to store a variety of data and software instructions (e.g., audio, video, control data, etc.), including meeting server control logic/software 225. The server also includes a network interface unit (e.g., card) 230 that enables network communications so that the server 110 can communicate with other devices, e.g., the presenter and attendee devices, as explained in further detail hereinafter. Memory 220 may comprise read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software (e.g., the meeting server control logic/software 225) comprising computer executable instructions and when the software is executed (by the processor 210) it is operable to perform the operations described herein.

Figure 3:
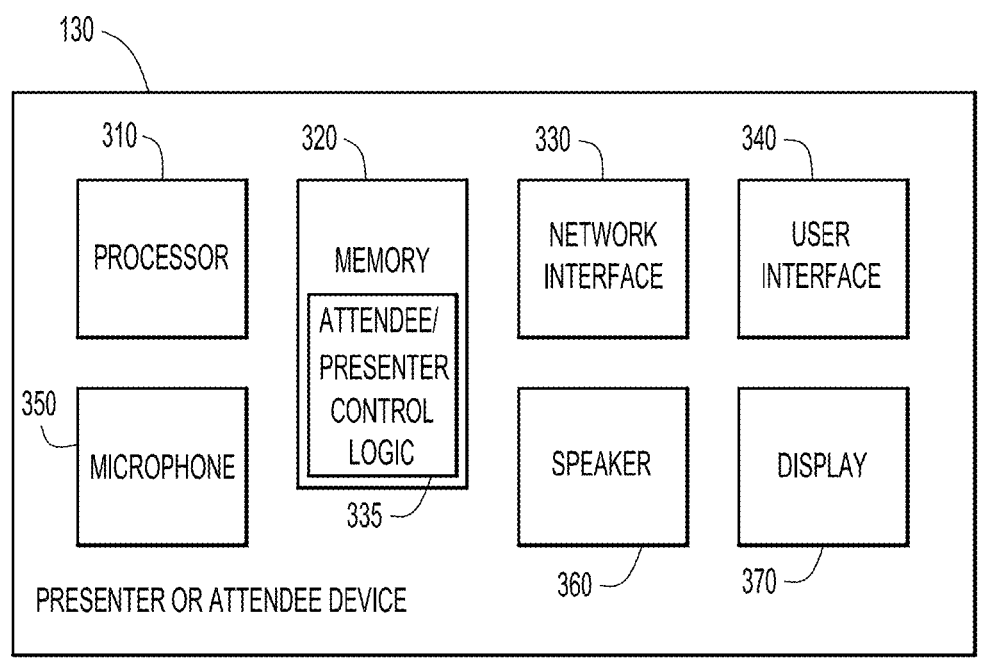
FIG. 3 is a block diagram of an example attendee device configured to join the online meeting, according to an example embodiment.

Referring now to FIG. 3, a simplified block diagram of an example device 300, e.g., presenter device or attendee device is shown. The device includes a processor 310 to process instructions relevant to a conference/meeting session supported by the system 100, memory 320 to store a variety of data and software instructions (e.g., display data for shared documents, applications, as well software instructions for a browser application to enable the connectivity and display of data during a meeting, implement attendee/graphical user interfaces, etc.). The processor 310 is, for example, a microprocessor or microcontroller that executes instructions of attendee/attendee control logic 335 in memory 320 for implementing the processes described herein. Processor 310 may include an audio processor component to process audio and an image/video processor component to process images and video. The device also includes a network interface unit (e.g., card) 330 to communicate with other devices over network 140. Device 130 may further include a user interface unit 340 to receive input from a user, microphone 350 and speaker 360. The user interface unit 340 may be in the form of a keyboard, mouse and/or a touchscreen user interface to allow for a user of the attendee device to interface with the device. Microphone 350 and speaker 360 enable audio to be recorded and output, respectively, and may comprise an array of a plurality of microphones and/or speakers. Device 130 may also comprise a display 370, including, e.g., a touchscreen display, that can display data to a user, such as content associated with a meeting.

In a transmit direction, device 300 is configured to encode audio and image data captured locally (i.e., at the device) into encoded audio and image packets, and then transmit the packets to meeting server 110, which then forwards the packets to presenter device 120. The audio may be audio sensed by microphone 350. In a receive direction, device 300 is configured to receive the encoded packets, decode the packets to recover the audio and image data therein, and then present the audio and image data locally. Device 300 may operate in a mute mode or an unmute mode under selective control of processor 310. In the unmute mode the local attendee can speak (and be heard by other participants) in an audio session of an online meeting, while in the mute mode the local attendee cannot speak and be heard by others in the online meeting. Normally, in the unmute mode, microphone 350 is enabled and device 300 (i) encodes audio sensed by the microphone into encoded audio packets, and (ii) transmits the encoded audio packets to presenter device 120 through meeting server 110. Techniques presented herein modify this operation. According to those techniques, a user of device 300 may actively trigger a question recording session on the device, as will be described in detail below. Regardless of the mute/unmute status of device 300 when the session is triggered, once the question recording session is triggered, the device records audio sensed by microphone 350 as a user question; however, if the device is in the unmute mode, the device does not transmit encoded audio packets to meeting server 110 (during the question recording session) as the device normally would have in the absence of the recording session.

Memory 320 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 320 may comprise one or more tangible (non-transitory) computer readable storage media (e.g., a memory device) encoded with software (e.g., attendee/presenter control logic/software 335) comprising computer executable instructions and when the software is executed (by the processor 310) it is operable to perform the operations described herein. Logic 335 includes instructions to generate and display graphical user interfaces to present information on display 370 and allow an attendee/presenter to provide input to the device depicted in FIG. 3 through, e.g., user selectable options of the graphical user interface. In attendee devices 130-136, logic 335 performs operations related to an attendee device described below. In presenter device 120, logic 335 performs operations related to a presenter device described below.

Figure 4:
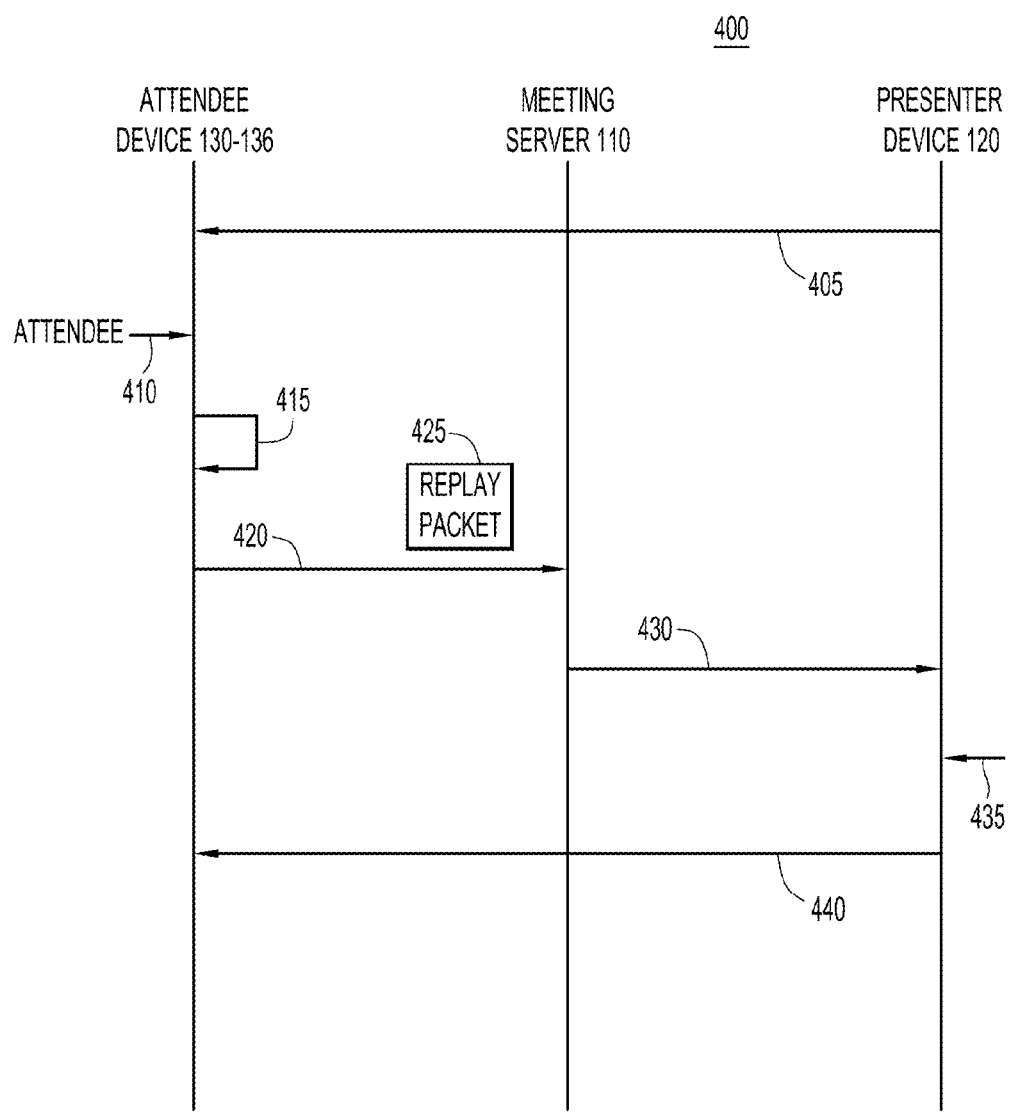
FIG. 4 is an illustration of example high-level transactions that occur in the online meeting, according to an example embodiment.

With reference to FIG. 4, there is depicted an example of high-level transactions that may occur in an online meeting in conference system 100 according to techniques for handling questions submitted by attendees presented herein. At 405, presenter device 120 shares multimedia content (e.g., a presenter desktop, an application, a document, presenter audio, etc.) with all of attendee devices 130-136 through meeting server 110. At any time during the meeting, an attendee/user associated with any of attendee devices 130-136 may conveniently submit a recorded multimedia question to presenter device 120. To do this, at 410, an attendee simply presses on a point-of-interest (also referred to as a "press point") in the shared content that is displayed on the attendee device for a predetermined period of time to trigger/activate a question recording session on the attendee device. A user may press on a press point using a mouse or a finger or other physical element on a touch screen display of an attendee device.

In response, at 415, the attendee device records into a multimedia question replay packet or file (i) a snapshot of the shared image currently displayed on the attendee device, (ii) a location of the press point, and (iii) audio/voice from the attendee while the press-point continues to be pressed by the attendee past the predetermined time period. At 420, when the attendee releases the press point, the attendee device ends the question recording session and transmits the multimedia question replay packet (indicated at 425) to meeting server 110. At 430, meeting server 110 sends a message to presenter device 120 that identifies the question (in replay packet form) received from the attendee device. More generally, meeting server 110 sends messages corresponding to all questions submitted by all of the attendee devices to presenter device 120. Presenter device 120 displays a graphical user interface that identifies the attendee questions that were announced by meeting server 110. At 435, through the graphical user interface, a presenter associated with presenter device 120 may selectively retrieve the question replay packets from meeting server 110, preview the recorded content in the retrieved packets, and, at 440, share that content with all of the attendees.

Techniques to trigger and handle attendee questions in an online meeting at both the attendee device side and the presenter device side are now describe in detail. First, attendee device techniques are described with reference to FIGS. 5-14. Then, presenter device techniques are described with reference to FIGS. 15-20.

Figure 5:
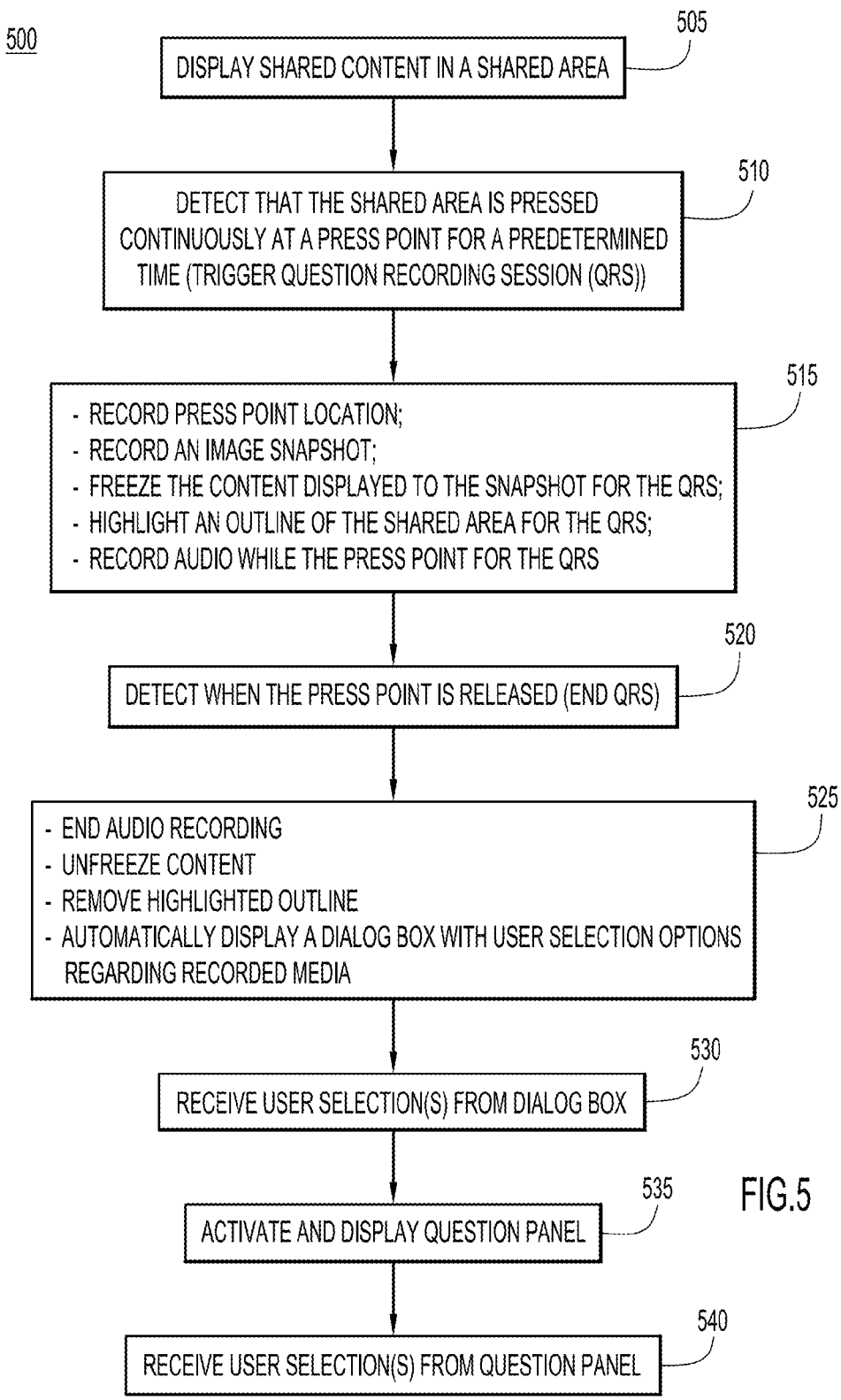
FIG. 5 is a flowchart of an example method to submit an attendee question in the meeting performed at the attendee device, according to an example embodiment.
Figures 11, 12, 13:
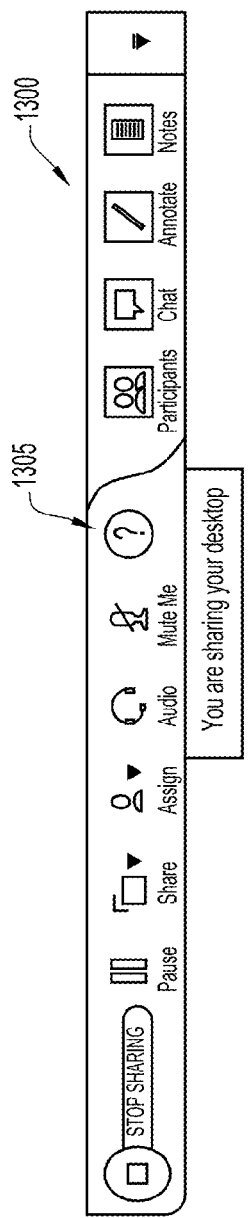
FIGS. 11-13 are illustrations of information displays on an attendee device associated with the question recording session of FIGS. 7-10, according to an example embodiment.

With reference to FIG. 5, there is depicted a flowchart of an example method 500 performed in an attendee device to trigger question recording in an online meeting and submit the recorded question to presenter device 120. Method 500 is described also with reference to additional FIGS. 7-13, in which FIGS. 7-10 show illustrative interactions between an attendee and an attendee device associated with a question recording session, and FIGS. 11-13 show illustrative information displays on an attendee device associated with the question recording session from FIGS. 7-10.

At 505, the attendee device displays shared content from presenter device 120 in a shared area (also referred to as a "sharing area") on a display of the attendee device.

At 510, the attendee device detects that the shared area is pressed continuously at a press point therein for a predetermined time to activate or trigger a question recording session in the attendee device. The press point represents a point-of-interest in the content in the shared area. In one embodiment, the attendee device may detect that a mouse button has been pressed continuously while a mouse cursor associated with the mouse button is positioned at the press point. In another embodiment in which the attendee device displays shared content on a touch screen of the attendee device, the attendee device may detect that the touch sensitive screen has been pressed continuously at a location on the screen coinciding with the press point. With reference to FIG. 7, there is an illustration of an example attendee device 700 in the form of a Smartphone equipped with a touchscreen display 705, and an attendee (finger) 710 interacting physically with the touchscreen display. In FIG. 7, attendee 710 is shown initially pressing a press point 715 at a location within a current shared area 720 displayed on display 705.

Returning again to FIG. 5, at 515, in response to detecting that the question recording session has been triggered at 510, the attendee device:

a. highlights an outline of the shared area (the image snapshot) while the press point continues to be pressed continuously past the predetermined time (see FIG. 8, described below);

b. freezes the content displayed in the shared area to the snapshot area while the press point continues to be pressed continuously past the predetermined time;

c. records a location of the press point in the shared area.

d. captures/records an image snapshot of the content displayed in the shared area at the time the question recording session was triggered; and e. records audio sensed by the microphone while the press point continues to be pressed continuously past the predetermined time (see FIG. 9, described below).

With reference to FIG. 8, there is an illustration of a highlighted outline 805 of current shared area 720 that is displayed after attendee 710 has continuously pressed press point 715 for the predetermined time period, and while the attendee continues to press the press point after the predetermined time period. The highlighted outline signifies to the attendee that the question recording session has been triggered and that the attendee device is recording audio while the outline is displayed.

With reference to FIG. 9, there is an illustration of attendee 710 recording a question with attendee device 700 while outline 805 indicates the device is recording audio.

Returning to FIG. 5, at 520, the attendee device detects when the press point is released (i.e., no longer pressed). This signifies the end of the question recording session. In response to detecting the release of the press point and thus the end of the question recording session, the attendee device:

a. ends the audio recording;

b. unfreezes the content in the shared area so that new shared content from presenter device 120 may be displayed therein;

c. removes the highlighted outline (see FIG. 10, described below);

d. packages the recorded snapshot, recorded location of the press point in the snapshot, and the recorded audio into a multimedia question replay packet; and e. automatically constructs and then displays a pop-up or dialog box that presents user selection options to store locally, upload to meeting server 110, and not retain any of the recorded snapshot and the recorded audio (see FIG. 10). The dialog box also presents a thumbnail view of the recorded snapshot and the location of the press point therein.

With reference to FIG. 10, there is an illustration of device 700 just after attendee 710 has released press point 715 (neither of which are shown in FIG. 10). When the press point is released, attendee device 700 ends audio recording, removes highlighted outline 805 from the display, and displays a dialog box 1005 in shared area 720. Dialog box 1005 is shown in exploded view at the right-hand side of FIG. 10. Dialog box 1005 includes a thumbnail view 1010 of the recorded snapshot of shared area 720 and the following user selectable options: option 1015 to save the recorded media (snapshot and audio) locally; option 1020 to upload the recorded media to presenter device 120 (through conference server 110); and option 1025 to cancel/delete (i.e., not retain) the recorded media. Further user selectable options 1030 and 1035 permit the attendee to select which recorded media, i.e., the snapshot and/or the audio, that options 1015, 1020, and 1025 will act upon when/if selected by the attendee.

Returning again to FIG. 5, at 530, the attendee device receives a user selection of an option in the dialog box regarding whether to store locally, upload to a meeting server, or not retain any of the recorded snapshot and audio (i.e., recorded media), and performs a required action in accordance with the selected option. For example, in response to a user selection in the dialog box, the attendee device performs any of the following operations:

a. creates and uploads the recorded audio, the recorded snapshot, and the recorded press point location as a multimedia replay packet to meeting server 110 in response to a selection to upload both the recorded audio and the recorded snapshot. Alternatively, the attendee device uploads only (i) the recorded snapshot (and press point location), or (ii) the recorded audio;

b. stores the recorded audio, the recorded snapshot, and recorded press point location locally (in memory of the attendee device) in response to a selection to store the recorded snapshot and audio locally. Alternatively, only the recorded snapshot (and press point location) or the recorded audio may be stored locally; and c. deletes either or both of the recorded snapshot and the recorded audio as appropriate in response to a selection not to retain either or both of the recorded snapshot and the recorded audio.

In addition to the dialog box, attendee device constructs a question panel after the question recording session has ended (see FIGS. 11 and 12, described below). The question panel provides selectable options to modify selections previously received from the attendee through the dialog box. To access the question panel, the attendee device displays a user selectable icon (e.g., a question mark "?") associated with the question panel that, when selected by the user (either by touch screen or mouse, for example), causes the attendee device to display the question panel.

At 535, the attendee device receives a selection of the icon associated with the question panel and, in response, activates and displays the question panel (see FIGS. 11 and 12).

At 540, the attendee device receives selections of options presented in the question panel and performs corresponding operations.

With reference to FIG. 11, there is depicted an example question panel 1100 that may be activated and displayed on an attendee device. Question panel 1100 lists questions identified at Q1, Q2 on the left-hand side of the panel that were recorded previously and a current disposition of the media associated with each question based on selections made previously from a dialog box associated with each question. User selectable fields 1110, 1115, and 1120 permit the attendee to modify the selections previously made with respect to each question Q1, Q2. For example, toggle/select fields 1110 and 1115 may be activated (toggled) by clicking thereon. Media delete fields "Del" may be activated similarly.

With reference to FIG. 12, there is an illustration of a floating thumbnail view 1205 of the recorded snapshot associated with question Q1 that the attendee device displays when the attendee device detects that a mouse cursor hovers over or near the identifier Q1 in question panel 1100.

With reference to FIG. 13, there is an illustration of an online meeting bar 1300 that the attendee device may display during the meeting. Meeting bar 1300 includes a user selectable question panel icon 1305 that, when selected, i.e., clicked-on, causes the attendee device to display the question panel of FIG. 12, for example.

Figure 6:
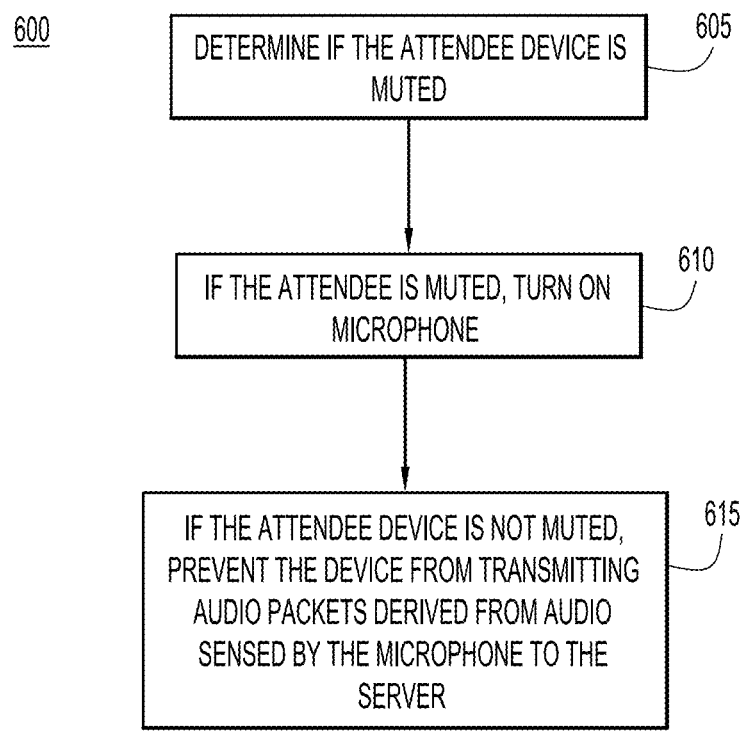
FIG. 6 is a flowchart of a method of handling an audio mute/unmute status of the attendee device when the attendee has triggered a question recording session, according to an example embodiment.

With reference to FIG. 6, there is depicted a flowchart of an example method 600 of handling an audio mute/unmute status of the attendee device that is invoked when the attendee has triggered a question recording session at 510 in method 500. Method 600 is performed in parallel with operations 515 and 520 in method 500. Regardless of whether the attendee device is in the mute or unmute mode, once a question recording session is triggered, the attendee device automatically records audio sensed by the local microphone as question information for a replay packet. If the attendee device happens to be in the unmute mode when the session is triggered, the attendee device still records the sensed audio as question information, but is prevented from automatically sending encoded audio packets to meeting server 110 during the recording session. This operation is described in the following sequence of operations.

At 605, the attendee device determines if it is currently operating in a mute mode (i.e., muted) in which the local microphone is turned off and the attendee device is prevented from transmitting audio packets constructed from audio sensed by the local microphone.

At 610, if the attendee device determines it is operating in the mute mode, the attendee device turns on the local microphone to sense audio from the attendee that is recorded at operation 515.

At 615, if the attendee device determines it is not in the mute mode, the attendee device ceases transmitting audio packets derived from audio sensed by the microphone to meeting server 110.

Figure 14:
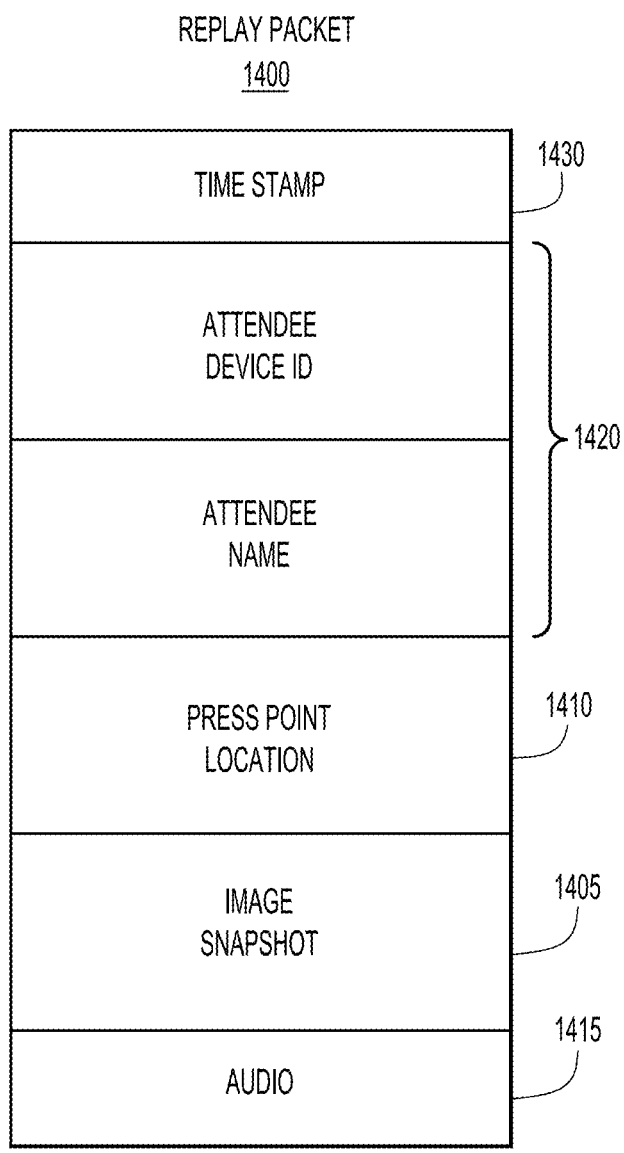
FIG. 14 is an illustration of example multimedia question replay packet, according to an example embodiment.

With reference to FIG. 14, there is depicted an example multimedia question replay packet 1400. The attendee device constructs replay packet 1400 after a question recording session has ended and then uploads the replay packet to presenter device 120 through meeting server 110 if the attendee has selected the upload option. Replay packet 1400 includes a recorded image snapshot 1405, information 1410 indicating a location of a press point in the image snapshot, and recorded audio 1415. Recorded image snapshot 1405 and recorded audio 1415 may each include compressed media content. Replay packet 1400 also includes identifiers (IDs) 1420 that identify the attendee device and the associated attendee (by name) that created the replay packet, and a time stamp 1430 indicating when the replay packet was created and/or uploaded.

Figure 15:
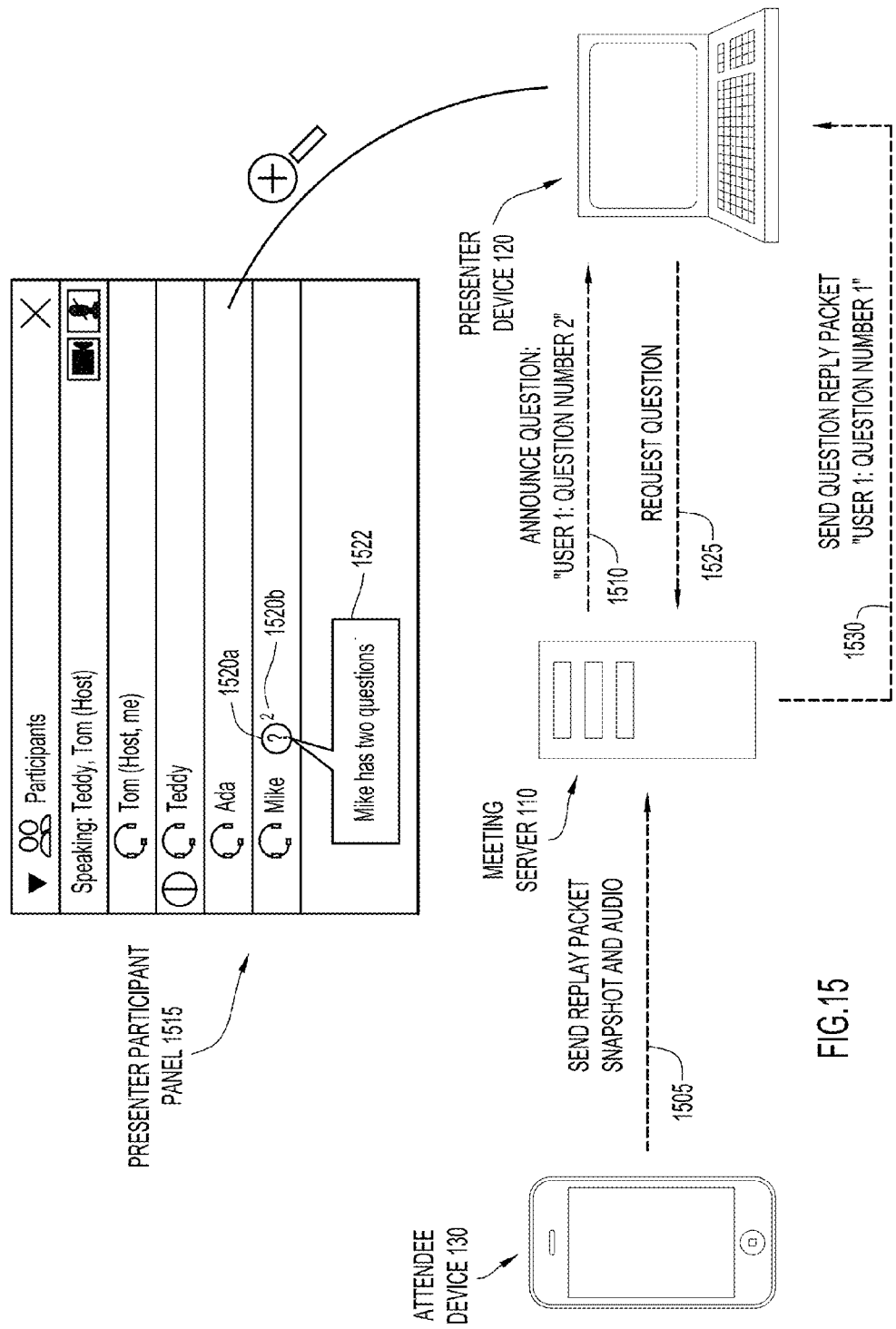
FIG. 15 is an illustration of an example process of handling questions submitted by attendee devices performed at a meeting server and a presenter device during the online meeting, according to an example embodiment.

Turning to FIG. 15, techniques are now described for handling attendee questions at the meeting server and presenter device side of an online meeting. With reference to FIG. 15, there is depicted an illustration of an example process 1500 of handling questions submitted by attendee devices 130-136 performed at meeting server 110 and presenter device 120 during the online meeting.

At 1505, attendee devices 130-136 each send corresponding question replay packets to meeting server 110, which receives the packets. The question replay packets may include multimedia replay packets, just audio packets, or just image snapshot (and press point location) packets. Meeting server 110 stores all of the received question packets.

At 1510, meeting server 110 sends messages to presenter device 120 that identify each question sent by each attendee device to the meeting server. Each message may be an abbreviated version of the question replay packet that the message identifies. For example, a given message may include time stamp 1430 and identifiers 1420 of a corresponding replay packet 1400. In the example of FIG. 15, a message sent by meeting server 110 may use the label "user 1: question number 2" to identify a second question submitted from an attendee device with identifier "1" associated with an attendee named "Mike." Thus, the messages sent by server 110 identify the question, the attendee device that sent the question, and the associated/corresponding attendee (e.g., attendee name).

Presenter device 120 receives the messages from meeting server 110. Presenter device 120 displays an attendee list 1515 (also referred to as a presenter "participant panel" 1515) (shown in exploded view at the top of FIG. 15). Participant panel 1515 lists all of the attendee names associated with corresponding attendee devices joined with the presenter device in the online meeting. Presenter device 120 also annotates each listed attendee (name) with user selectable question identifiers 1520*a*, 1520*b* that correspond with all of the questions identified in the messages from meeting server 120 for that attendee (e.g., all of the question from Mike). In the example of FIG. 15, question identifier 1520*a* is a user selectable question mark icon ("?") that indicates the adjacent attendee name (e.g., Mike) has sent questions. Question identifier 1520*b* is a number of questions that the attendee has sent (e.g., 2). Presenter device 120 may also display a text bubble 1522 that includes text stating a number of questions submitted by the attendee (e.g., Mike has sent 2 questions).

The presenter associated with presenter device 120 may select a question of interest for an attendee from participant panel 1515. For example, the presenter may click on either of selectable question identifiers 1520*a*, 1520*b*. In response, at 1525 presenter device 120 sends a request identifying the selected question to meeting server 110. In the example of FIG. 15, the request identifies question number 1 from "user 1" (from "Mike") mentioned above.

Figure 17:
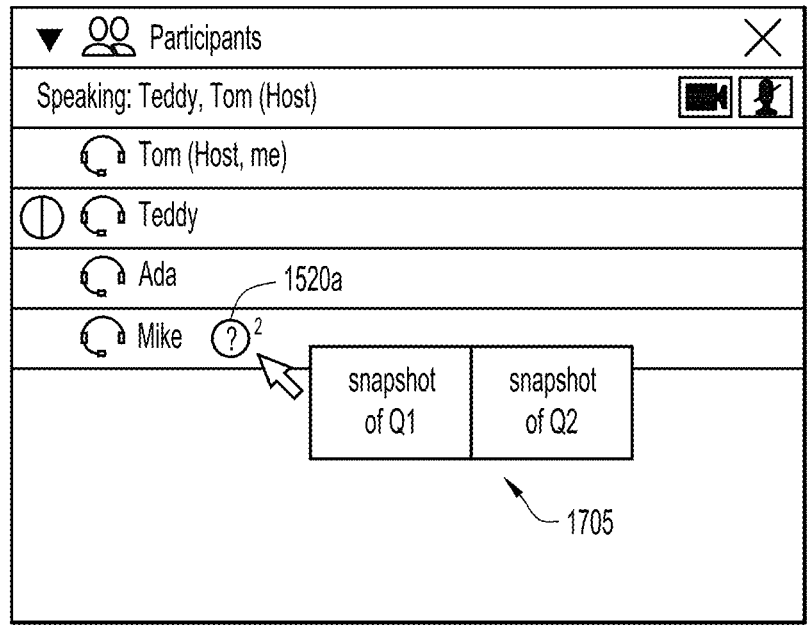
FIG. 17 is a participant panel/attendee list presented on a display of a presenter device including floating views of image snapshots associated with questions from an attendee that have already been retrieved from a meeting server by the attendee device, according to an example embodiment.

Meeting server 110 receives the request. In response, at 1530 meeting server 110 sends to presenter device 120 the question replay packet corresponding to the question identified in the request, e.g., the question replay packet for the question identified as "user 1: question 1." In the example, this is the question associated with attendee "Mike." More generally, depending on the request from presenter device 120, meeting server 110 may also return a fuller set of information, including, for example: "user 1: question 1, snapshot, press point location, and time of the question" to enable the presenter to review the question quickly, as indicated in FIG. 17. Additionally, meeting server 110 may send an entire question replay packet, such as packet 1400, to enable the presenter to selectively playback the question and thereby share the question with all other attendees, or simply review the question only locally (i.e., only at the presenter device) and not share the question with the other attendees.

The presenter at presenter device 120 may instruct the presenter device to share the retrieved question with all attendees in the meeting. To this, presenter device 120 replays the question replay packet while sharing the content therein with the attendees in the meeting. The replay operation plays the recorded audio and presents the recorded snapshot as shared content in the shared areas of all attendees (and on a shared area of presenter device 120).

Figure 16:
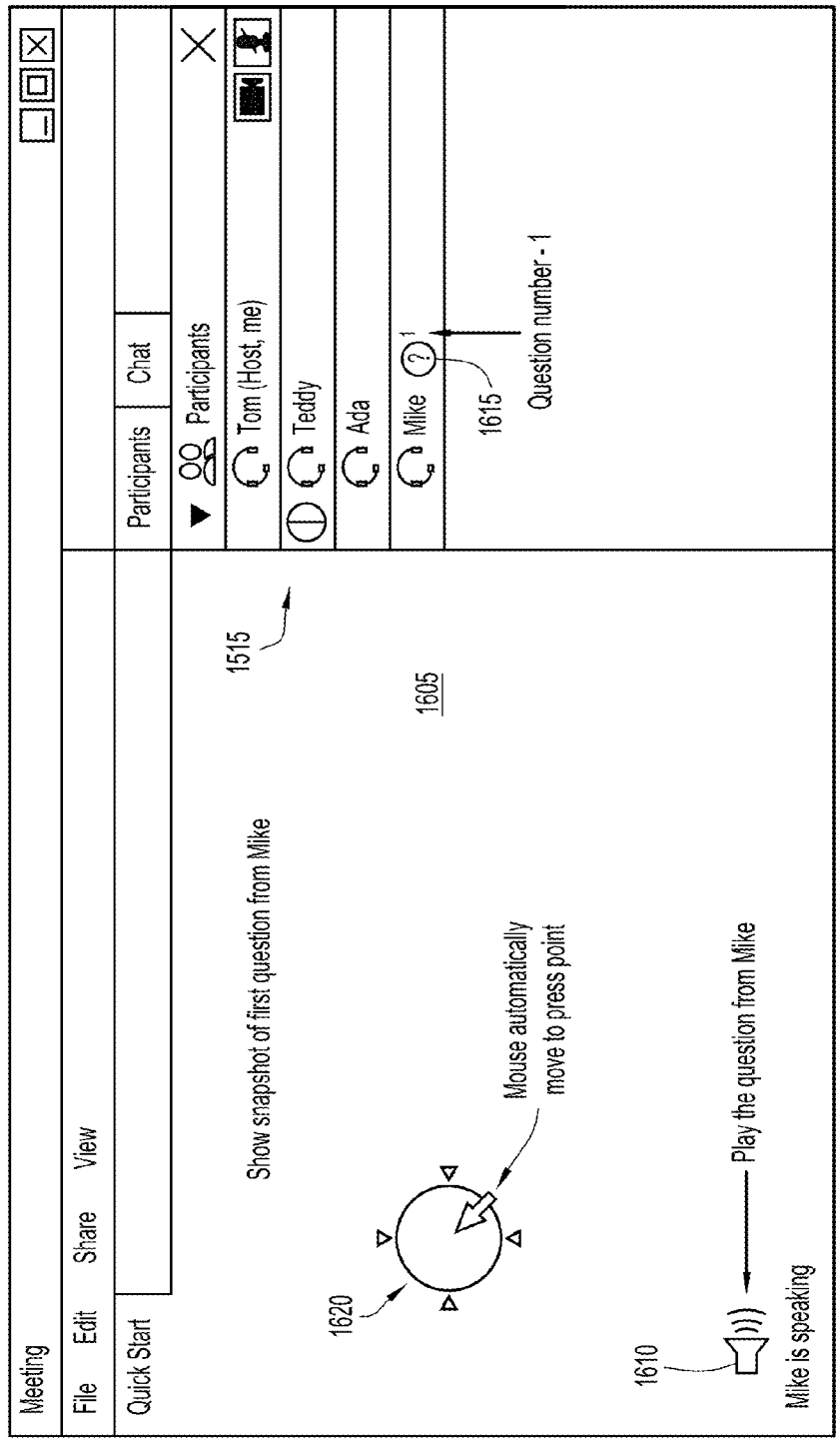
FIG. 16 is an illustration of content displayed on a display of a presenter device when the presenter device replays a question replay packet corresponding to a question from an attendee, according to an example embodiment.

With reference to FIG. 16, there is depicted an illustration of content 1600 displayed on a display of presenter device 120 after the presenter has instructed the presenter device to replay the replay packet corresponding to "question number 1" from "Mike." A shared region of the display presents the image snapshot 1605 from the replay packet, while the recorded audio is also played, as indicated at 1610. Also, presenter device 120 extracts the press point location from the replay packet and automatically moves a displayed mouse cursor to the press point location 1620 in the snapshot shared area. In addition, participant panel 1515 indicates which question is being shared currently (indicated at 1615 in FIG. 1600).

The presenter may wish to review a pending attendee question before actually instructing presenter device 120 to share the question in the online meeting. Accordingly, presenter device 120 enables the presenter to preview a question locally (i.e., not shared) using either participant panel 1515 or a presenter question panel, as discussed below.

With reference to FIG. 17, there is depicted participant panel 1515 including floating views 1705 of image snapshots associated with questions Q1 and Q2 for attendee "Mike" that presenter device 120 has already retrieved from meeting server 110 in the manner described above. Presenter device 120 is configured to present floating views 1705 when a cursor is placed on or near question icon 1520*a*.

Figure 18:
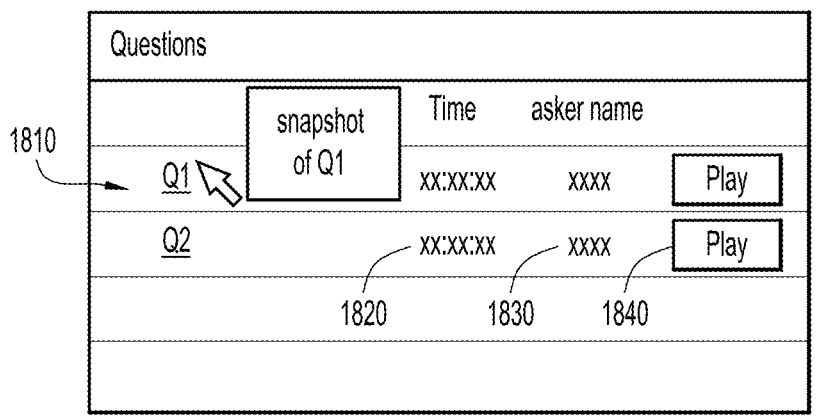
FIG. 18 is an illustration of a question panel constructed by a presenter device responsive to messages received from a meeting server that announce questions submitted from attendees, according to an example embodiment.

In another preview approach, presenter device 120 constructs a presenter question panel now discussed with reference to FIG. 18. FIG. 18 is an illustration of a presenter question panel 1800 constructed by presenter device 120 based on the content of the messages received from meeting server 110 at 1510 in FIG. 15 (i.e., the messages that announce the questions that attendees have sent to the meeting server). Question panel 1800 lists in tabular form question identifiers 1810 (e.g., question Q1, Q2) for all of the questions sent by all of the attendees listed in the presenter participant panel and, for each of the listed question identifiers (e.g., Q1, Q2), a time 1820 when the question indicated by the question identifier was created/sent, a name 1830 corresponding to the attendee that sent the question, and a user selectable "play" icon 1840. When the play icon is selected, presenter device 120 retrieves the replay packet corresponding to the identified question from meeting server 110, and then plays while sharing the retrieved replay packet.

Figure 19:
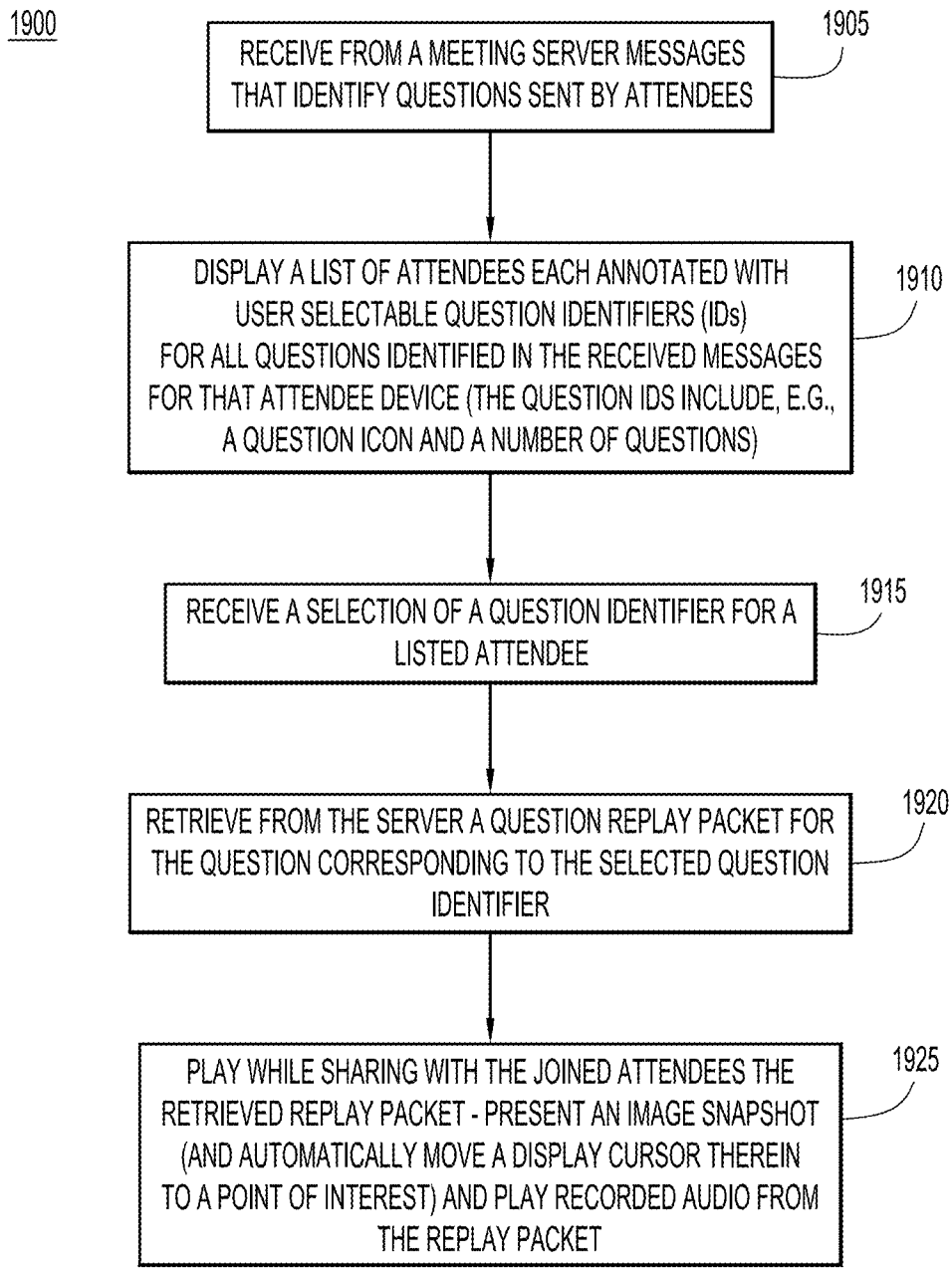
FIG. 19 is a flowchart of an example method of handling questions from attendees in an online meeting performed at a presenter device, according to an example embodiment.

With reference to FIG. 19, there is depicted a flowchart of a method 1900 of handling questions from attendees in an online meeting performed at presenter device 120. Method 1900 summarizes operations described above in connection with FIGS. 15-17.

At 1905, presenter device 120 receives from meeting server 110 messages that identify questions sent by attendees in the meeting.

At 1910, presenter device 120 displays a list of attendees each annotated with user selectable question IDs for all questions identified in the received messages for that attendee device. The question IDs include, e.g., a question icon and a number of questions for the attendee.

At 1915, presenter device 120 receives a selection (from the presenter) of a question ID for a listed attendee.

At 1920, presenter device 120 retrieves from meeting server 110 a question replay packet for the question corresponding to the selected question ID.

At 1925, presenter device 120 plays while sharing with the joined attendees the retrieved replay packet. This includes presenting an image snapshot (and automatically moving a display cursor therein to a point-of-interest or press point) and playing recorded audio from the replay packet.

Figure 20:
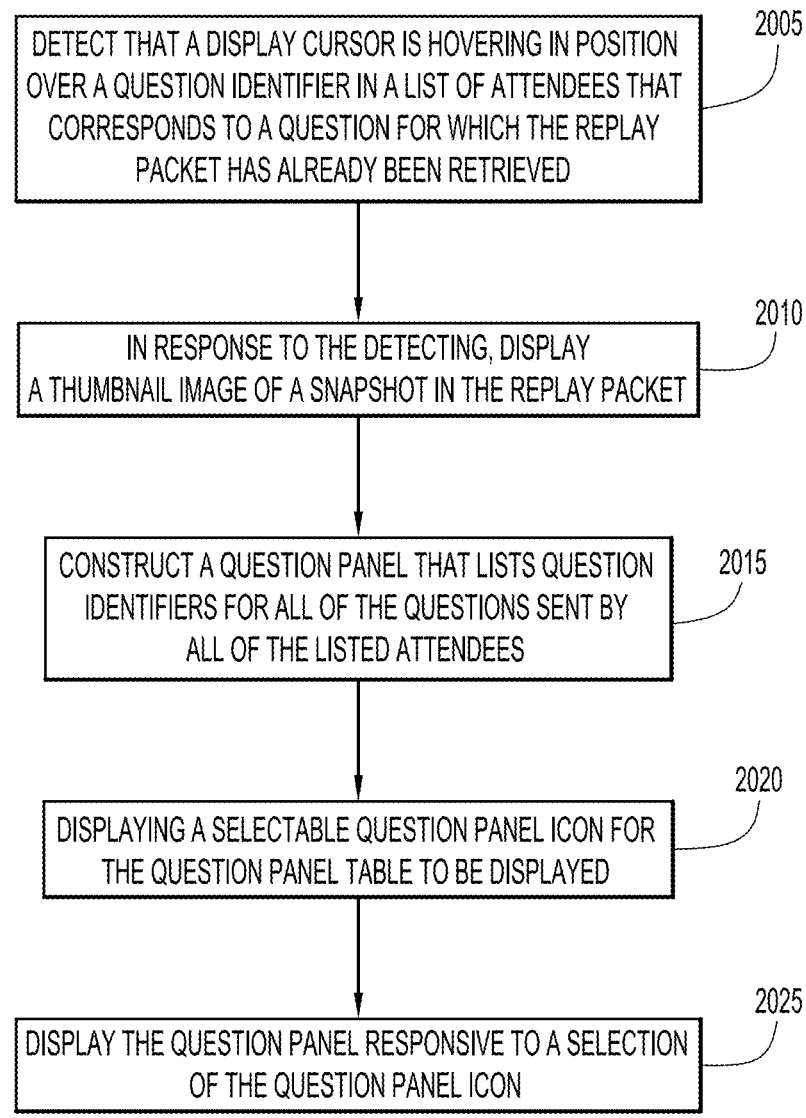
FIG. 20 is a flowchart of further operations performed by the presenter device in association with the method of FIG. 19, according to an example embodiment.

With reference to FIG. 20, there is depicted a flowchart of further operations 2000 performed by presenter device 120 in association with the operations in method 1900.

At 2005, presenter device 120 detects that a display cursor is hovering in position near or over a question identifier in attendees list (presenter participant panel) 1515 that corresponds to a question for which a replay packet has already been retrieved by presenter device 120 (see, e.g., FIG. 17).

At 2010, in response to the detecting at 2005, the presenter device 120 displays a thumbnail image (e.g., 1705 in FIG. 17) of the snapshot in the replay packet.

At 2015, presenter device 120 constructs a question panel (e.g., question panel 1800) that lists question identifiers for all of the questions sent by all of the listed attendees and, for each of the listed question identifier, a time when the question indicated by the question identifier was sent, a name corresponding to the attendee that sent the question, and a selectable play icon which, when selected, causes the replay packet corresponding to the identified question to be retrieved from meeting server 110 and played (while being shared).

At 2020, presenter device 120 displays a selectable question panel icon which, when selected, causes the question panel to be displayed. The question panel icon may be displayed on a banner of the participant panel/attendee list 1515 and be similar in form to the question mark icon 1305 of attendee device banner 1300 depicted in FIG. 13.

At 2025, presenter device 120 displays the question panel responsive to a selection of the question panel icon.

The techniques presented herein help a presenter and/or attendees in an online meeting to ask/submit questions and share the submitted questions in a way that is convenient for both the question askers (attendees) and the presenter. The techniques permit the meeting to flow smoothly by minimizing interruptions of the presenter. The techniques are convenient for mobile attendees. The techniques conveniently enable an attendee to record a question through a microphone of the attendee device without manually tending to a mute/unmute status thereof and capture a snapshot of shared content. When the attendee has finished recording the question, the attendee device displays options to save the question locally or upload the question to a presenter. Thus, the techniques provide a flexible and effective mechanism to ask questions in a meeting. The techniques present submitted questions to the presenter in a vivid manner through the use of snapshot thumbnail views and question icons. The techniques provide a convenient way to trigger a recording session for a mobile attendee. The techniques help the presenter to control the rhythm of meeting, and facilitate smooth question-and-answer segments in the meeting.

In summary, in one form, a method is provided, comprising: at an attendee device configured to communicate with a presenter device in an online meeting in which the presenter device is configured to share content with the attendee device: displaying the content in a shared area; detecting that the shared area is pressed continuously at a press point therein for a predetermined time and, in response: recording a location of the press point in the shared area; recording an image snapshot of the shared area; and recording audio sensed by a local microphone while the press point continues to be pressed after the predetermined time; and detecting when the press point is released and, in response: ending the audio recording; and uploading to the presenter device at least one of (i) the recorded audio, and (ii) the recorded snapshot and the recorded press point location.

In another form, an apparatus is provided, comprising: a network interface unit configured to enable communications over a network to exchange content with a presenter device in an online meeting; and a processor coupled to the network interface unit, and configured to: generate display data to display the content in a shared area; detect that the shared area is pressed continuously at a press point therein for a predetermined time and, in response: record a location of the press point in the shared area; record an image snapshot of the shared area; and record audio sensed by a local microphone while the press point continues to be pressed after the predetermined time; and detect when the press point is released and, in response: end the audio recording; and upload to the presenter device at least one of (i) the recorded audio, and (ii) the recorded snapshot and the recorded press point location.

In still another form, a method is provided, comprising: at a presenter device configured to communicate with attendee devices corresponding to attendees in an online meeting in which the presenter device is configured to share content with the attendee devices and the attendee devices send questions as replay packets to the presenter device: receiving messages that identify each question sent by each attendee device and the corresponding attendee; displaying a list of attendees each annotated with user selectable question identifiers for all questions identified in the received messages as corresponding to that attendee; receiving a selection of a question identifier for a listed attendee; retrieving the multimedia replay packet for the question corresponding to the selected question identifier; and playing while sharing with the attendee devices the retrieved replay packet.

In another form, an apparatus is provided, comprising: a network interface unit configured to enable communications over a network to exchange content with attendee devices in an online meeting in which the attendee devices send online meeting questions as replay packets; a processor coupled to the network interface unit, and configured to: obtain received messages that identify each question sent by each attendee device and the corresponding attendee; generate for display a list of attendees each annotated with user selectable question identifiers for all questions identified in the received messages as corresponding to that attendee; receive a selection of a question identifier for a listed attendee; retrieve the multimedia replay packet for the question corresponding to the selected question identifier; and cause the retrieved replay packet to be played while sharing with the attendee devices.

The above description is intended by way of example only. Various modifications and structural changes may be made therein without departing from the scope of the concepts described herein and within the scope and range of equivalents of the claims.

What is claimed is:

1. A method comprising:
at an attendee device configured to communicate with a presenter device in an online meeting in which the presenter device is configured to share content with the attendee device:
displaying the content in a shared area;
detecting that the shared area is pressed continuously for a predetermined time period at a press point therein to indicate a point-of-interest in the content in the shared area and that is to be communicated to the presenter device and, in response:
recording a location of the press point in the shared area;
recording an image snapshot of the shared area; and
recording audio sensed by a local microphone and displaying a highlighted outline of the snapshot of the shared area to indicate that the recording audio is in progress while the press point continues to be pressed after the predetermined time period; and
detecting when the press point is released and, in response:
ending the audio recording;
removing the highlighted outline of the snapshot of the shared area; and
uploading to the presenter device the recorded audio, the recorded snapshot, and the recorded press point location.

2. The method of claim 1, further comprising, while the press point continues to be pressed after the predetermined time period:
freezing the content displayed in the shared area to the snapshot.

3. The method of claim 2, further comprising, in response to detecting when the press point is released:
unfreezing the content displayed in the shared area.

4. The method of claim 1, further comprising, in response to detecting that the shared area is pressed continuously at a press point therein for the predetermined time period:
determining if the attendee device is in a mute mode in which the local microphone is turned off and the attendee device is prevented from transmitting audio packets;
if the attendee device is determined to be in the mute mode, turning on the local microphone to detect audio; and
if the attendee device is determined not to be in the mute mode, preventing the attendee device from transmitting audio packets derived from audio sensed by the microphone to a meeting server.

5. The method of claim 1, further comprising:
displaying a dialog box that presents user selection options to store locally, upload to the presenter device, and not retain any of the recorded snapshot and the recorded audio;
receiving a user selection of one of the options in the dialog box; and
storing locally, uploading to the presenter device, or not retaining, the recorded snapshot and the recorded audio as indicated by the selected option.

6. The method of claim 5, further comprising uploading to the presenter device the recorded audio, the recorded snapshot, and the recorded press point location responsive to the selected option.

7. The method of claim 5, further comprising displaying in the dialog box a thumbnail view of the snapshot and the press point therein.

8. The method of claim 5, further comprising:
receiving a user selection to display a question panel that provides user selectable options to modify selections previously received through the dialog box and, in response, displaying the question panel;
receiving user selections of one or more options in the question panel; and
modifying one or more user selections previously received through the dialog box based on the one or more selected question panel options.

9. The method of claim 1, wherein the displaying includes displaying the shared content in a shared area on a touch sensitive screen, and the detecting that the shared area is pressed includes detecting that the touch sensitive screen is pressed at the press point.

10. An apparatus comprising:
a processor of a server coupled to a network interface unit configured to:
communicate over a network to exchange content with a presenter device in an online meeting;
generate display data to display the content in a shared area;
detect that the shared area is pressed continuously for a predetermined time period at a press point therein to indicate a point-of-interest in the content in the shared area and that is to be communicated to the presenter device and, in response: record a location of the press point in the shared area; record an image snapshot of the shared area; and record audio sensed by a local microphone and display a highlighted outline of the snapshot of the shared area to indicate that the recording audio is in progress while the press point continues to be pressed after the predetermined time period; and
detect when the press point is released and, in response: end the audio recording; remove the highlighted outline of the snapshot of the shared area; and upload to the presenter device the recorded audio, the recorded snapshot, and the recorded press point location.

11. The apparatus of claim 10, wherein the processor is further configured to, while the press point continues to be pressed after the predetermined time period:
freeze the content displayed in the shared area to the snapshot.

12. The apparatus of claim 11, wherein the processor is further configured to, in response to detecting when the press point is released:
unfreeze the content displayed in the shared area.

13. The apparatus of claim 10, wherein the processor is further configured to, in response to detecting that the shared area is pressed continuously at a press point therein for a predetermined time period:
determine if the attendee device is in a mute mode in which the local microphone is turned off and the attendee device is prevented from transmitting audio packets;
if the attendee device is determined to be in the mute mode, turn on the local microphone to sense audio; and if the attendee device is determined not to be in the mute mode, prevent the attendee device from transmitting audio packets derived from audio detected by the microphone to a meeting server.

14. The apparatus of claim 10, wherein the processor is further configured to:
    display a dialog box that presents user selection options to store locally, upload to the presenter device, and not retain any of the recorded snapshot and the recorded audio;
    receive a user selection of one of the options in the dialog box; and
    upload to the presenter device the recorded audio, the recorded snapshot, and the press point location responsive to the selected option.

15. The apparatus of claim 10, wherein the processor is configured to display by displaying the shared content in a shared area on a touch sensitive screen, and detect that the shared area is pressed by detecting that the touch sensitive screen is pressed at the press point.

16. A non-transitory computer readable storage media encoded with instructions that, when executed by a processor of an attendee device configured to communicate with a presenter device in an online meeting in which the presenter device is configured to share content with the attendee device, cause the processor to:
    generate display data to display the content in a shared area;
    detect that the shared area is pressed continuously for a predetermined time period at a press point therein to indicate a point-of-interest in the content in the shared area and that is to be communicated to the presenter device and, in response:
        record a location of the press point in the shared area;
        record an image snapshot of the shared area; and
        record audio sensed by a local microphone and generate for display a highlighted outline of the snapshot of the shared area to indicate that the recording audio is in progress while the press point continues to be pressed after the predetermined time period; and
    detect when the press point is released and, in response:
        end the audio recording;
        remove the highlighted outline of the snapshot of the shared area; and
        upload to the presenter device the recorded audio, the recorded snapshot, and the recorded press point location.

17. The computer readable storage media of claim 16, further comprising instructions to cause the processor to, while the press point continues to be pressed after the predetermined time period:
    freeze the content displayed in the shared area to the snapshot.

18. The computer readable storage media of claim 17, further comprising instructions to cause the processor to, in response to detecting when the press point is released:
    unfreeze the content displayed in the shared area.

19. The computer readable storage media of claim 16, further comprising instructions to cause the processor to, in response to detecting that the shared area is pressed continuously at a press point therein for a predetermined time period:
    determine if the attendee device is in a mute mode in which the local microphone is turned off and the attendee device is prevented from transmitting audio packets;
    if the attendee device is determined to be in the mute mode, turn on the local microphone to detect audio; and
    if the attendee device is determined not to be in the mute mode, prevent the attendee device from transmitting audio packets derived from audio sensed by the microphone to a meeting server.

20. The computer readable storage media of claim 16, further comprising instructions to cause the processor to:
    generate for display a dialog box that presents user selection options to store locally, upload to the presenter device, and not retain any of the recorded snapshot and the recorded audio;
    receive a user selection of one of the options in the dialog box; and
    store locally, upload to the presenter device, or not retain, the recorded snapshot and the recorded audio as indicated by the selected option.

21. The computer readable storage media of claim 16, further comprising instructions to cause the processor to upload to the presenter device the recorded audio, the recorded snapshot, and the recorded press point location responsive to the selected option.

22. The computer readable storage media of claim 16, further comprising instructions to cause the processor to generate for display in the dialog box a thumbnail view of the snapshot and the press point therein.

23. The computer readable storage media of claim 16, further comprising instructions to cause the processor to:
    receive a user selection to display a question panel that provides user selectable options to modify selections previously received through the dialog box and, in response, displaying the question panel;
    receive user selections of one or more options in the question panel; and
    modify one or more user selections previously received through the dialog box based on the one or more selected question panel options.

* * * * *